Jan. 23, 1962 R. G. CUMINGS 3,018,440
COHERENT PULSE RATE DIVIDER CONSISTING OF COUNTER, MONOSTABLE MULTIVIBRATOR, AND PENTODE COINCIDENCE GATE
Filed March 10, 1959 2 Sheets-Sheet 1

INVENTOR
RICHARD G. CUMINGS

BY Richard C. Reed

ATTORNEY

Jan. 23, 1962 R. G. CUMINGS 3,018,440

COHERENT PULSE RATE DIVIDER CONSISTING OF COUNTER, MONOSTABLE MULTIVIBRATOR, AND PENTODE COINCIDENCE GATE

Filed March 10, 1959 2 Sheets-Sheet 2

INVENTOR
RICHARD G. CUMINGS

BY Richard C. Reed

ATTORNEY

United States Patent Office 3,018,440

Patented Jan. 23, 1962

3,018,440

COHERENT PULSE RATE DIVIDER CONSISTING OF COUNTER, MONOSTABLE MULTIVIBRATOR, AND PENTODE COINCIDENCE GATE

Richard G. Cumings, 2716 Ramblewood Drive, District Heights, Md.

Filed Mar. 10, 1959, Ser. No. 798,566

3 Claims. (Cl. 328—41)

(Granted under Title 35, U.S. Code (1952), sec. 266)

The invention described herein may be manufactured and used by or for the Government of the United States of America for governmental purposes without the payment of any royalties thereon or therefor.

The present invention relates to a variable synchronous pulse repetition rate divider circuit. In particular there is disclosed herein a novel gating circuit which passes only certain preselected pulses in a train of information pulses in order to reduce the repetition rate.

A number of circuits exist in the prior art which may be used for dividing the pulse repetition rate of a pulse train. In general these circuits employ a chain of bistable multivibrators connected in tandem. In the process the original pulses are discarded and new pulses are created by each multivibrator. The final pulse is generally produced by a monostable or one-shot multivibrator which may be adjusted to produce rectangular pulses having any given width.

This system is not satisfactory when it is necessary to maintain the exact shape and phase of the incoming information pulses. Slight variations in the components of the multivibrator, due to temperature for example, will alter the phase of the output pulses. The output multivibrator determines the shape of the output pulse and in this respect is entirely independent of the input waveform.

An object of the present invention is, therefore, to provide a pulse rate divider, for use with a source of information pulses, which reduces the repetition rate of information pulses emitted by a source and yet preserves the shape and time position of pulses in the resultant output wavetrain, relative to corresponding pulses in the original input wavetrain.

A further object of the invention is to provide a novel gating circuit for use with a source of information pulses, wherein the action of the gate is automatically synchronized with particular information pulses which occur in a preselected sequence.

These and other objects of the invention will be better understood with reference to the accompanying drawing wherein.

Basically the invention involves the combination of a pulse rate divider circuit and a special form of "AND" gate which shall hereafter be referred to as a "unipulse" gate. The unipulse gate is designed to pass without distortion a pulse applied to its normal input whenever a control pulse is applied to a control input. The same input pulses, which may have various forms and time sequences, operate both gate inputs, but the pulses to the control input pass first through the pulse rate divider circuit. The pulse rate divider has as part of its inherent function substitutes newly generated pulses for selected pulses from the wave train. These pulses do not attempt to duplicate the shape or the time position of the original pulse, but actually are made broader in time to bracket the original pulse for positive and unambiguous control. Since the unipulse gate does not generate a new pulse, its output is coherent with respect to the input, that is, all of the input pulse characteristics such as shape and relative time position are recognizable in the resulting output pulse.

Figure 1:
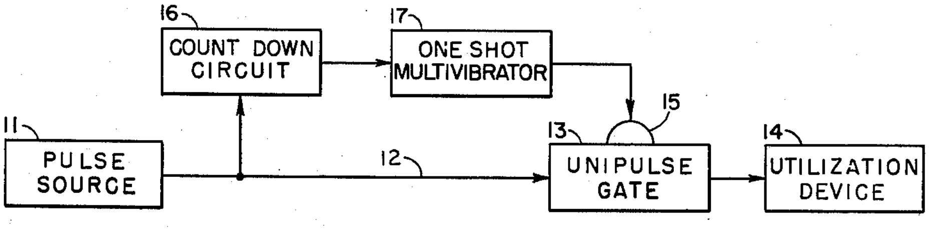
FIG. 1 shows a block diagram of the invention.

Referring to FIG. 1 the pulse rate dividing circuit is shown connected to a source of information pulses 11. To reach the utilization device 14, the information pulses pass through the transmission path 12 and unipulse gate 13. The unipulse gate, however, is normally closed so that information pulses can pass only when a control pulse is applied to the control input 15.

The control pulses are obtained by applying the information pulses to a count down circuit 16 which in turn drives a mono stable one-shot multivibrator 17. The latter has an output connected to the control input 15 of the unipulse gate. The count down circuit 16 and multivibrator 17 are designed to open the unipulse gate after a predetermined number of information pulses are applied. The gate remains open only long enough to insure the passage of one pulse to the utilization device. The output pulse rate is thus reduced, since the predetermined number of pulses in path 12 are blocked by the closed gate. In order to better explain the operation of the circuit a specific embodiment will be described.

Figure 2:
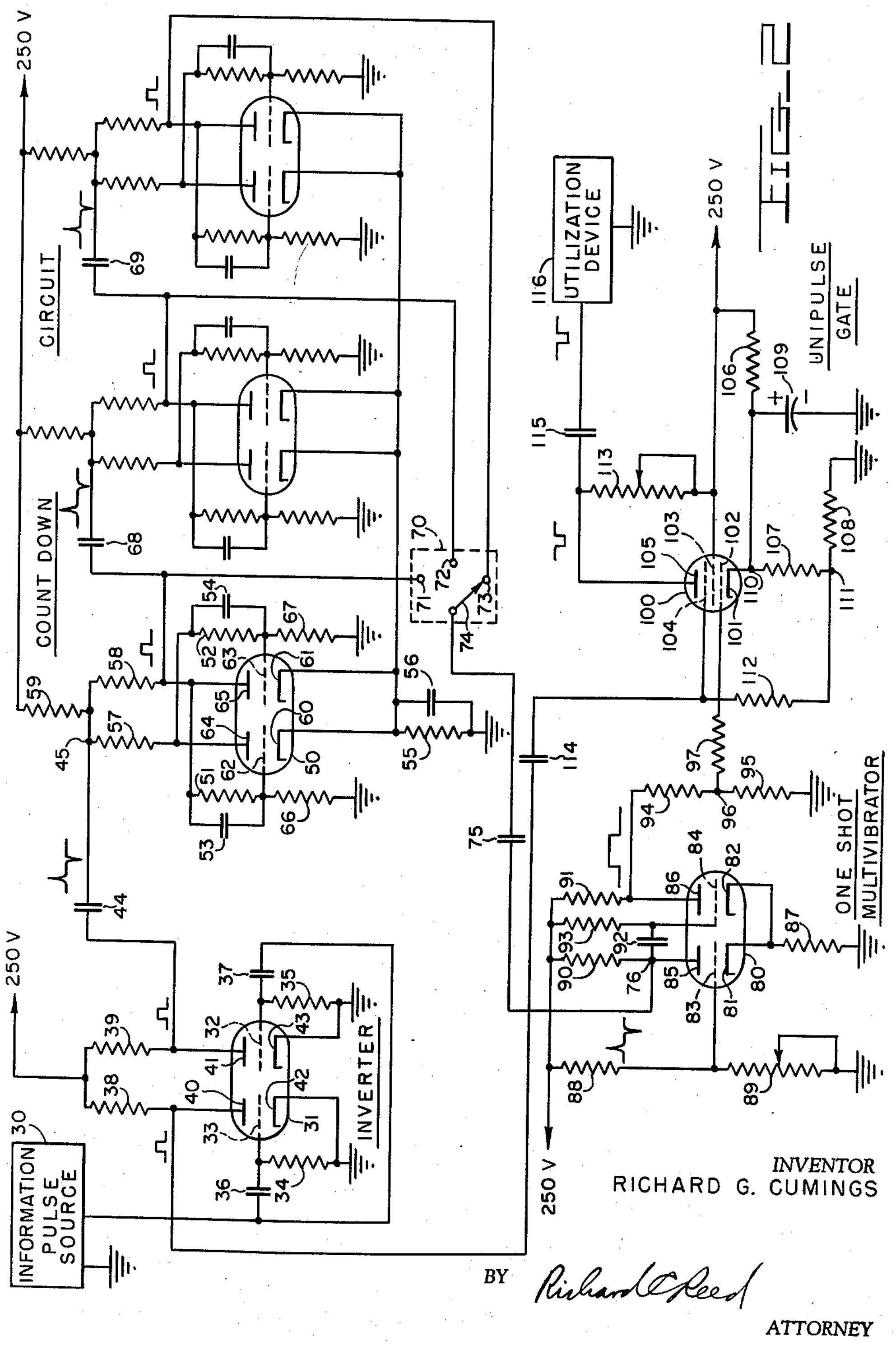
FIG. 2 shows in detail one embodiment of the invention.

FIG. 2 shows an embodiment of the invention which operates in conjunction with a source of negatively polarized information pulse 30. The information pulses are applied to the grids 32 and 33 of the dual triode 31, which reverses the polarity of the information pulses and increases their strength. The triodes are provided with conventional grid leak resistors 34 and 35, input coupling capacitors 36 and 37, and plate load resistors 38 and 39. Each plate is coupled through its respective load to a D.C. current source (not shown) having a potential of 250 volts above the ground reference level employed in the source 30 and shared by the cathodes 42 and 43. No bias potential is necessary between the grids and cathodes, since the input signals are negative. No information is supplied, in this instance, by the pulse amplitude; the leading and trailing edges of the input pulse are, therefore, permitted to drive the triodes from saturation to near or below cutoff.

The signal developed at plate 41 is applied through capacitor 44 to the input terminal 45 of the first bistable multivibrator in the count down circuit. By choosing a sufficiently small value for capacitor 44 the pulse 41 may be differentiated by the time it reaches terminal 45, so as to provide a more narrow triggering pulse for the count down circuit. As is well understood in the art, the value of such a capacitor depends on the value of input resistance to which the capacitor is coupled, the product of the two values being less than the input pulse width.

The count down circuit, for simplicity, is shown as a train of identical bistable multivibrators connected in cascade. Each multivibrator consists of a dual triode 50 with the plates 64 and 65 and grids 62 and 63 cross-coupled in a conventional manner by resistors 51 and 52. These resistors are bypassed by capacitors 53 and 54, respectively, which have a low impedance at the pulse repetition frequency. The grids are connected to the common ground through grid leak resistors 66 and 67. The cathodes such as 60 and 61 of all of the bistable multivibrators are interconnected and share a self bias circuit consisting of resistor 55 and capacitor 56 in parallel connected between the cathodes and ground. Each plate is connected to a source of plate current having a potential of 250 volts through plate resistors 57 and 58 and dropping resistor 59; the latter being shared by the two triodes in each multivibrator. The multivibrators are intercoupled by coupling one plate of each multivibrator, as for example plate 65 to the input terminal of the next multivibrator in the chain. The same plate of each multivibrator is also connected to different ones of the taps 71, 72 or 73 of switch 70. The contact arm 74 completes a circuit from one of the contacts, such as 73, through a coupling capacitor 75 to the input terminal of a monostable or one-shot multivibrator.

The one-shot multivibrator consists of a dual triode 80 with the cathodes 81 and 82 the triodes interconnected and biased by the common cathode resistor 87. The input terminal 76 is directly connected to the plate 85 of the input triode. The grid 83 of the input triode is provided with a fixed bias by the voltage divider including fixed resistor 88 and adjustable resistor 89. The voltage divider is connected across the output of a 250 volt plate current source with the adjustable resistor 89 between the grid 83 and the grounded terminal of the plate current source. The plates are connected to the plate current source (not shown) through plate resistors 90 and 91. The grid of the output triode is coupled by capacitor 92 to the input terminal 76.

The input capacitor 75 has value sufficiently small to differentiate the output pulses from the count down circuit. This is particularly important because these pulses frequently are much wider than the period of the one-shot multivibrator. The grid 84 of the output triode is initially maintained at a high positive potential by connecting this electrode to the positive terminal of the plate current source through resistor 93. As a result the output triode conducts a near saturation current through the bias resistor 87.

The bias voltage thus generated raises the cathode potential of the input triode above cutoff. The positive input pulse from the count down circuit raises the plate voltage of the input triode, but cannot overcome the negative grid to cathode bias voltage. The negative pulses produced by differentiation, however, drive the grid 84 toward cutoff. Tihs action is reinforced by the decreasing plate potential as the input triode begins to conduct, due to the resultant rise in potential of cathode 81. In the process the capacitor 92 becomes charged, thereby sustaining a negative grid to cathode bias on the output triode. The capacitor 92 then gradually discharges through the resistors 93 and 90 until the voltage on grid 84 rises sufficiently to permit conduction in the output triode.

The particular one-shot multivibrator shown in FIG. 2 was chosen because the period of oscillation is determined by a potential on the linear portion of the discharge characteristic of capacitor 92. The value of this potential depends on the grid bias of the input triode which is adjusted by varying resistor 89. While it is not usually necessary to know the exact period of vibration of this circuit, certain advantages of this arrangement will become apparent as the gating action of the invention is developed. A gating pulse of the magnitude required to drive the unipulse gate is obtained by connecting a voltage divider comprising resistors 94 and 95 between the plate of the output triode and ground.

The unipulse gate consists of a pentode 100 having its first control grid 102 connected to the centertap 96 of the voltage divider across the one-shot multivibrator through the current limiting resistor 97. The screen grid 103 is connected to a current source, not shown, having a D.C. potential of 250 volts. The cathode is biased above screen current cutoff by means of a voltage divider comprising resistors 106, 107 and 108. This voltage divider is connected between the screen 103 and the common ground return to provide an upper voltage tap 110 and a lower voltage tap 111. The upper voltage tap 110 is connected to the cathode 101 to supply the above mentioned bias to that element. A smoothing capacitor 109 is connected between cathode 101 and the common ground return. This capacitor has a value sufficient to provide a low impedance path to ground for cathode current pulses, as compared to the path through resistors 107 and 108. The suppressor grid 104 is biased nearer the cathode voltage than the first control grid by connecting a grid leak resistor 112 between the lower voltage tap 111 in the cathode circuit and the suppressor grid. The D.C. plate voltage is supplied through an adjustable load resistor 113 connected to the positive terminal of the screen current source. A coupling capacitor 114, having a sufficiently high capacitance to pass the amplified and inverted information pulses, is connected between the plate 40 of the inverter tube and the suppressor grid 104 of the unipulse gate.

When a gating pulse and an information pulse are applied to the unipulse gate simultaneously, the information pulse alone appears in the plate circuit, there being no plate pulses when either pulse is applied by itself. Since the first control grid is biased below cutoff, no plate or screen current flows until a gating pulse is applied. When the gating pulse alone is applied current flows in the screen circuit, but, owing to the voltage drop across resistor 107 produced by the screen current, sufficient bias is applied to the suppressor grid to prevent conduction in the plate circuit. The gating pulses are purposely given a magnitude greater than that required to draw a constant saturation screen current. Thus, when the plate current is produced by applying an information signal to the suppressor grid, the plate current is solely a function of the information pulse. The magnitude of the output pulse can be adjusted by varying the load resistor 113. A coupling capacitor 115 similar to capacitor 114 is used to couple the plate of the unipulse gate to the positive terminal of a grounded utilization device.

Obviously, there are a host of components well known in the art which can be substituted for the various components specifically described above. Count down circuits using elements other than vacuum tubes and having dividing functions other than binary are readily available. There are also numerous one-shot multivibrators described in the literature. The input signal in some cases might be inverted by means of a transformer, or the inverter may be eliminated altogether. Any circuit capable of performing the functions ascribed to the unipulse gate in FIG. 2 may be substituted for this portion of the circuit.

In the embodiment shown only the time position of the leading and trailing edges of the information pulses were to be preserved. The inverter and unipulse gate plate currents could therefor be driven to saturation. Where the shape of the pulse is to be preserved this of course is not permitted.

Figure 3:
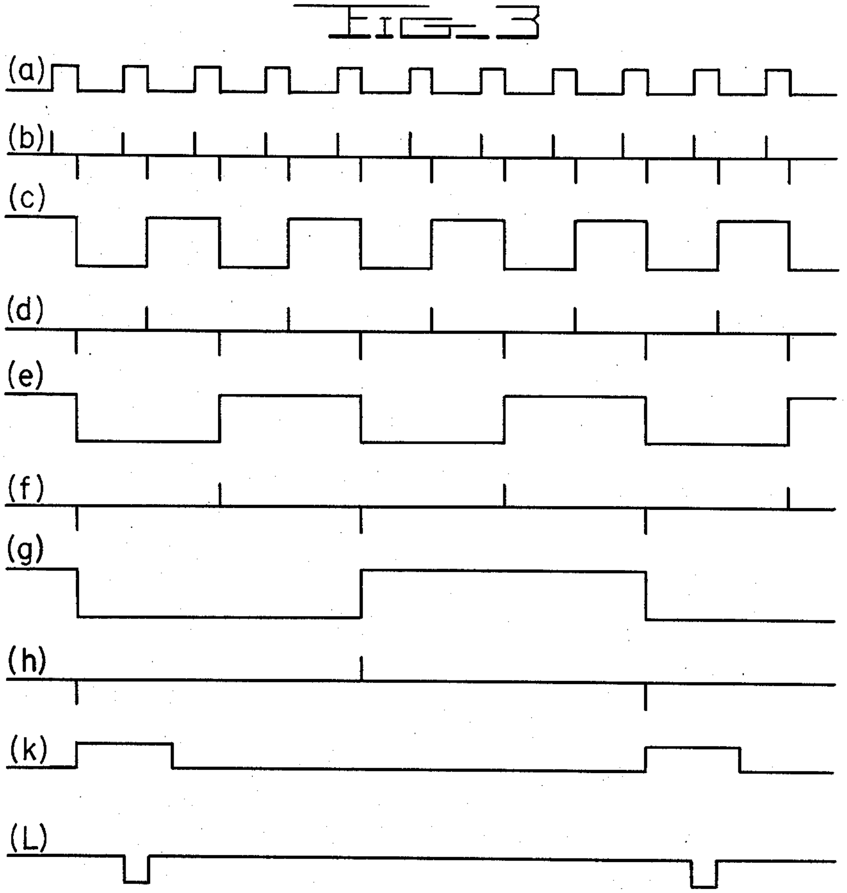
FIG. 3 shows the waveforms which occur at various points in FIG. 2.

FIG. 3 shows the wave trains produced at various points in the circuit by a train of negative pulses from the information source. FIG. 3*a* represents the plate voltage of the inverter; 3*b* represents the differentiated input to the count down circuit; 3*c* represents the plate voltage on the output triode of the first bistable multivibrator in the count down circuit, 3*d*–3*g* represent input and output waveforms from the second and third bistable multivibrators, successively; 3*h* represents the differentiated input to the one-shot multivibrator; 3*k* shows the adjustable width output pulses from the one-shot multivibrator; and 3L shows the output pulses from the unipulse gate. Note that the gating pulses 3*k* occur after an input pulse and last for approximately half the quiescent period following a succeeding pulse. The time position and length of the gating pulses may thus be altered considerably by the count down or one-shot multivibrator circuits before the gating pulse will interfere with either output pulses (*l*) or the pulses (*a*) from the inverter which are normally to be blocked at the unipulse gate.

Typical components of the circuits of FIG. 2 are:

| | | | |
|---|---|---|---|
| 31 | Vacuum tube | | 12AU7 |
| 34 | Resistor | | 470K |
| 35 | Resistor | | 470K |
| 36 | Capacitor | mfd | 0.1 |
| 37 | Capacitor | mfd | 0.1 |
| 38 | Resistor | | 20K |
| 39 | Resistor | | 10K |
| 44 | Capacitor | mmfd | 100 |
| 50 | Vacuum tube | | 12AU7 |

| | | | |
|---|---|---|---|
| 51 | Resistor | | 330K |
| 52 | Resistor | | 330K |
| 53 | Capacitor | mmfd | 50 |
| 54 | Capacitor | mmfd | 50 |
| 55 | Resistor | | 3.3K |
| 56 | Capacitor | mfd | 0.01 |
| 57 | Resistor | | 47K |
| 58 | Resistor | | 47K |
| 59 | Resistor | | 22K |
| 66 | Resistor | | 120K |
| 67 | Resistor | | 120K |
| 68 | Capacitor | mmfd | 50 |
| 69 | Capacitor | mmfd | 50 |
| 75 | Capacitor | mmfd | 100 |
| 80 | Vacuum tube | | 6J6 |
| 87 | Resistor | | 1.5K |
| 88 | Resistor | meg | 1 |
| 89 | Potentiometer | | 10K |
| 90 | Resistor | | 47K |
| 91 | Resistor | | 22K |
| 92 | Capacitor | mfd | .007 |
| 93 | Resistor | meg | 1 |
| 94 | Resistor | | 680K |
| 95 | Resistor | | 270K |
| 97 | Resistor | | 100K |
| 100 | Vacuum tube | | 6AS6 |
| 106 | Resistor | | 18K |
| 107 | Resistor | | 4.7K |

Obviously many modifications and variations of the present invention are possible in the light of the above teachings. It is therefore to be understood that within the scope of the appended claims the invention may be practiced otherwise than as specifically described.

What is claimed is:

1. A coherent pulse rate divider circuit comprising, a first transmission path having an input to which information pulses are applied, an output, normally closed unipulse gate means positioned in said path to block transmission therethrough, control means to open said gate in response to a control signal, said gate means being characterized in that the output pulses therefrom the same relative shape and time position as the input pulses which produce them, pulse forming means for generating a control signal, said pulse forming means including a triggered one-shot multivibrator having an output coupled to said control means and an input, and at least one pulse frequency divider coupling the input of said first transmission path to the input of said one-shot multivibrator.

2. A coherent pulse rate divider circuit comprising, a source of information pulses, a unipulse gate means with first and second inputs and an output for passing only those signals which are applied to said first input in coincidence with a signal applied to said second input, said gate means being characterized in that the output pulses therefrom have the same relative shape and time positions as the input pulses which produce them, a first coupling means connecting said first input to said source of information pulses, a count down circuit coupled to said source and having an output coupled to said second input of said unipulse gate, said count down circuit including at least one bistable multivibrator triggered by the trailing edges of said information pulses and a one-shot multivibrator triggered by the leading edges of output pulses from said bistable multivibrator, said one-shot multivibrator having a pulse width greater than the period between the trailing edges of the information pulses by a factor less than the quiescent period between said information pulses.

3. The divider circuit according to claim 2 wherein said gate means comprises, a vacuum tube including a screen grid, a control grid, a suppressor grid, a cathode, and a plate, supply means to apply a fixed voltage between said cathode, said screen grid and said plate to cause current flow to said cathode from each, bias means to apply a fixed voltage between said control grid and said cathode sufficient to place said tube at cut-off, a self biasing impedance network shunting said bias means, said suppressor grid being connected to a point in said network such that a near saturation screen to cathode current biases the suppressor grid to a voltage level below that required to cut off current flow from the plate.

References Cited in the file of this patent

UNITED STATES PATENTS

| | | |
|---|---|---|
| 2,489,303 | Lyons | Nov. 29, 1949 |
| 2,758,153 | Adler | Aug. 7, 1956 |
| 2,806,949 | Smith | Sept. 17, 1957 |
| 2,873,366 | Knight | Feb. 10, 1959 |
| 2,892,182 | Neff | June 23, 1959 |
| 2,960,656 | Cumings | Nov. 15, 1960 |

OTHER REFERENCES

"An Improved Resolving Time Measuring Device" (B. W. Roberts et al.), Review of Scientific Instruments, vol. 21, No. 9, September 1950. (Pages 790–796 relied on.)

"Pulse and Digital Circuits," by Millman and Taub, McGraw-Hill, 1956, pp. 407–409.

"Pulse Train Generator" (O. L. Saxilid), IBM Technical Disclosure Bulletin, vol. 1, No. 5, page 38, February 1959.